(12) United States Patent
Greaves et al.

(10) Patent No.: US 6,396,815 B1
(45) Date of Patent: *May 28, 2002

(54) PROXY-CONTROLLED ATM SUBNETWORK

(75) Inventors: David J. Greaves, Cambridge; Richard J. Bradbury, Liverpool, both of (GB)

(73) Assignee: Virata Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/649,200

(22) Filed: Aug. 28, 2000

Related U.S. Application Data

(63) Continuation of application No. 08/801,683, filed on Feb. 18, 1997, now Pat. No. 6,111,858.

(51) Int. Cl.[7] .......................... H04L 12/28; H04L 12/56
(52) U.S. Cl. ................... 370/256; 370/397; 370/389; 370/408; 370/465; 709/252
(58) Field of Search ................... 370/254, 256, 370/257, 395, 396, 397, 400, 401, 403, 408, 406, 389, 398, 465, 466, 467; 340/825.02; 709/201, 220, 238, 252

(56) References Cited

U.S. PATENT DOCUMENTS 6,104,696 A * 8/2000 Kadambi et al. ............ 370/397
6,111,858 A * 8/2000 Greaves et al. ............. 370/256
6,154,446 A * 11/2000 Kadambi et al. ............ 370/395

OTHER PUBLICATIONS

D. Greaves et al. "Low Cost ATM and the ATM Warren" Mar. 21, 1996.*

* cited by examiner

*Primary Examiner*—Alpus H. Hsu
*Assistant Examiner*—Afsar M. Qureshi
(74) *Attorney, Agent, or Firm*—Pennie & Edmonds LLP

(57) ABSTRACT

An ATM subnetwork, suitable for a low-cost home area network, comprises an interconnected mesh of simple ATM switches, end stations and multi-access buses implemented in fully-hardware configurations. Software for signalling and management functions does not reside in these devices, but rather is banished to computers outside the interconnected mesh. Specifically, an external controller acts a proxy for the simple ATM switches and performs all virtual channel connection set-up within the interconnected mesh. Additionally, proxy controllers manage each simple end station and proxy signalling agents permit standard ATM devices to be connected to the simple switches. These proxy processes communicate with the devices within the interconnected mesh via a control protocol of single cell messages delivered over dedicated permanent virtual circuits. The external controller performs a two-phase distributed topology determination algorithm to gain knowledge of the topology of the interconnected mesh sufficient to establish virtual channel connections.

24 Claims, 11 Drawing Sheets

PROXY-CONTROLLED ATM SUBNETWORK

This application is a continuation of application Ser. No. 08/801,683, filed on Feb. 18, 1997, now U.S. Pat. No. 6,111,858.

FIELD OF THE INVENTION

The present invention relates generally to data communication networks and, more particularly, to a low-cost asynchronous transfer mode subnetwork suitable for applications in a home environment.

BACKGROUND OF THE INVENTION

Asynchronous Transfer Mode ("ATM") is an emerging packet switching network technology designed to provide service for a wide variety of applications such as voice, video and data. Originally proposed for use in the Broadband Integrated Services Digital Network ("B-ISDN") by the International Telegraph and Telephone Consultative Committee ("CCITT"), now reorganized as the Telecommunications Standardization Sector of the International Telecommunication Union ("ITU-T"), ATM has moved beyond the wide area network setting into the private network arena as a platform for local area networks ("LANs") with multimedia capabilities. ATM is now well known in the art and is described in various references. See e.g., Martin de Prycker, *Asynchronous Transfer Mode: Solution for Broadband ISDN* (2nd Ed., Ellis Horwood Ltd., West Sussex, England, 1993).

In an ATM network, as defined by the CCITT standards, information is carried in packets of fixed size, specified for B-ISDN as 53 bytes or octets, called cells. These cells are individually labelled by addressing information contained in the first 5 bytes (octets) of each cell. Although ATM evolved from Time Division Multiplexing concepts, cells from multiple sources are statistically multiplexed into a single transmission facility. Cells are identified by the contents of their headers rather than by their time position in the multiplexed stream. A single ATM transmission facility may carry hundreds of thousands of ATM cells per second originating from a multiplicity of sources and travelling to a multiplicity of destinations.

ATM is a connection-oriented technology. Rather than broadcasting cells onto a shared wire or fiber for all network members to receive, a specific routing path through the network, called a virtual circuit, is set up between two end nodes before any data is transmitted. Cells identified with a particular virtual circuit are only delivered to nodes on that virtual circuit and are guaranteed to arrive at their destination in the transmitted order. ATM also defines virtual paths, bundles of virtual circuits traveling together through at least a portion of the network, the use of which can simplify network management.

The backbone of an ATM network includes switching devices capable of handling the high-speed ATM cell streams. Switching components of these devices perform the functions required to implement a virtual circuit by receiving ATM cells from an input port, analyzing the information in the header of the incoming cells in real-time, and routing them to the appropriate destination port.

An ATM network makes no guarantees that it will deliver each and every packet to its intended destination. Rather, ATM provides the capability of offering multiple grades of service in support of various forms of traffic requiring different levels of cell loss probability and propagation delay. It is known, for instance, that many multimedia connections, e.g., video streams, can tolerate relatively large cell losses, but are very sensitive to delay variations from one cell to the next. In contrast, traditional forms of data traffic are more tolerant of large propagation delays and delay variance, but require very low cell losses. Because of this ability to handle diverse data streams, ATM is an ideal platform for network configurations supporting both multimedia and conventional data transmission.

Applications such as video-conferencing or virtual reality have driven the deployment of ATM into the LAN setting. Simultaneously, a number of new applications directed at residential consumers have been proposed, such as video-on-demand ("VOD"), home theater, interactive television and multi-room stereo sound systems. The multimedia nature of these applications have led researchers to investigate the concept of a "home area network" ("HAN") capable of supporting these services. Indeed, the advent of a new wall socket in the home which gives wide area access at reasonable bandwidth, even though it will only be used initially for VOD applications, is an important seed towards establishing data outlets in every room in the house. In effect, this model tracks the deployment of residential telephone service over the last half century. This installed wiring could form the physical backbone of a HAN, and ATM, being well suited for multimedia applications, would be a logical choice as a network platform. However, for ATM technology to dominate a future HAN market, there must be more seeding routes which will introduce a diversity of ATM devices within the home.

One method for introducing ATM into the HAN field is to replace existing point-to-point interconnection systems with point-to-point ATM. SP-DIF, the digital interconnect for sound systems found on compact disc ("CD") and digital audio tape ("DAT") players and home theater products is a prime candidate. While the savings in component cost in moving from an SP-DIF implementation to an ATM implementation is arguable, the ATM version has the benefit that a switch can be inserted in series with a link to enable streams to be freely switched and routed.

This use of ATM could further enhance convergence of existing technologies. In the home, televisions have converged with stereo sound system components and will converge with multi-room sound systems and home theater components. Since all these devices may be implemented using ATM, there is a potential for new applications which integrate these components in various ways. For example, stereo speakers may be used for personal computer ("PC") sound output or a PC monitor may be employed to index a video or CD collection. Further, other home electronic components such as baby monitors, doorbells, heat control, and security components could be added to an ATM HAN. In fact, integration of these devices would enable sharing to reduce the total number of needed peripherals and processors. Instead of requiring separate loudspeakers in the answering machine, the television, the stereo HiFi, the doorbell and the baby monitor, one set of loudspeakers could be shared by these devices. This feature would have obvious benefit for people who frequently use headphones.

The provision of a wide-area connection to the home, used in conjunction with an ATM HAN, could enable the user to remotely answer the front door of the home, to check home security or monitor and control devices within the home. Similarly, an ATM HAN could facilitate remote meter reading for utilities, or even collection of television viewing rating information. As further examples, an ATM HAN could be used, in a class of protected housing for the elderly, to monitor room temperature and general activity as it is done today over the telephone system. In fact, a few mainstream ATM seeds, such as VOD, could spawn many similar applications.

Although it is apparent that an ATM HAN could yield many conceivable benefits, the technology to practically implement an ATM HAN has not previously existed. Some prior systems, mainly VOD trials, do exist which deploy ATM technology to the home in a minimal way. These systems, employed in early VOD trials, use ATM in the core of the network, but terminate ATM Adaption Layer Type 1 ("AAL1") circuit emulation before entry into the home. Instead, the home is fed with a fairly inflexible structure, such as a continuous MPEG multiplex transport stream. Although this is still one of the options recognized by the Digital Audio Visual Counsel, or DAVIC, it does not support multiple streams to the home or permit communication between devices within the home. Nor does the system support any sizable bandwidth out of the home.

A more sophisticated system was employed in the Cambridge Interactive Television ("iTV") Trial. See Geoff Vincent, *The Cambridge ITV Trial*, Online Media (1995). The system used in the Cambridge iTV Trial offers each home an ATM Forum compliant User Network Interface ("UNI") which can either be directly connected to a home set top box ("STB"), or connected to a consumer ATM switch. Being a UNI-compliant system, the cell format, traffic contract, signalling, and operations and maintenance procedures defined by the ATM Forum are followed. See G. Ratta, *ATM Forum User-Network Interface Specification, Version* 3.1 (ATM Forum publication, September 1994). Thus, any vendor's current generation ATM equipment can, in principle, be installed in a network within the home.

Although the Cambridge iTV Trial system theoretically provides capability of creating a HAN with a wide area access point, such a network would be far too costly to be deployed in the residential setting. Unfortunately, the switching devices and current interfaces required for ATM networks, including the Cambridge iTV system, make the use of these networks within the home prohibitively expensive. The major problem lies with current ATM protocols which require that the switches and end stations support vast quantities of signalling and management software, including a base set consisting of Q.2931, SSCOP, and SNMP. For a large class of possible simple ATM devices, such as those described above, the memory and processors required to implement these protocols is more expensive than the sum of the cost of the actual data handling components. Conceivably, lightweight versions of these protocols could be developed which would reduce the processing power necessary to implement simpler ATM switches and interfaces. However, even these protocols would require a minimum of software support which would be too costly for a large class of applications. Indeed, many devices could not be cost-effectively integrated into an ATM network unless fully-hardware switches and interfaces could be employed.

Therefore, a need persists for a reliable, yet low-cost, ATM HAN. Such a network would provide the service capability of conventional ATM networks and be able to support the full panoply of emerging multimedia applications for the home, but be inexpensive enough to be installed in residential environments.

SUMMARY OF THE INVENTION

In general, it is an object of the invention to provide a subnetwork using asynchronous transfer mode which has the advantage of meeting the requirements of emerging multimedia applications at a low cost.

It is a further object of the invention to decrease the cost of the subnetwork by controlling the subnetwork with external computer means to enable the use of inexpensive, simple ATM devices and switches.

It is a further object of the invention to allow the user to attach any device to any location in the subnetwork without manually configuring the subnetwork with unique identifiers for each device.

It is a further object of the invention to automate the determination of a spanning tree in the network which will be used to communicate control information.

These and other objectives are achieved by an ATM subnetwork comprising at least one end station communicating with at least one switch through at least one multi-access bus, where end stations and switches form an interconnected mesh, and a controller connected to the interconnected mesh for managing virtual circuits in the interconnected mesh which transport data between the end stations. The controller is external to the interconnected mesh and is connected to the interconnected mesh at a single control point, and may be optionally further connected to a conventional ATM network. The bus of the subnetwork is either bidirectional or unidirectional and functions as a distributed switch in the subnetwork.

The controller acts as a proxy for the switches within the interconnected mesh such that the signalling and management functions typically required by ATM protocols are performed by the controller, rather than the individual switches. Separate proxy controllers perform a similar function for the end stations, and proxy signalling agents permit standard ATM devices to connect to the switches. This off-loading of software to computers outside the interconnected mesh permits the switches and end stations to be implemented in low-cost full-hardware configurations.

The controller achieves this proxy control by communicating with switches via a control protocol. Each switch has an internal control address space accessible by the controller using the control protocol. The control protocol comprises single cell messages which enable the controller to read and write to locations within a switch's control address space. Each switch and end station has a unique network address defined by the topology of the interconnection of the switch relative to the single control point. This address comprises the concatenated sequence of switch port numbers forming the route through the interconnected mesh from the single control point to the switch, where the route is confined to a spanning tree superimposed on the interconnected mesh and rooted at the single control point. The controller presides over a distributed topology determination algorithm which determines this spanning tree.

Data originating from the conventional ATM network is presented to the interconnected mesh at the single control point. It is possible to connect other conventional ATM networks at points other than the single control point since the system uses switch proxies. This external point of connection may serve as a boundary of ownership and physical access. In particular, processes related to security, encryption, policing and authentication can be inserted at this place and implementation of these procedures is then shared over all devices and switches connected to each other.

In accordance with another aspect of the invention, a method for managing communications in a subnetwork using asynchronous transfer mode comprises the steps of interconnecting end stations and switches to form an interconnected mesh, presenting data to the interconnected mesh at a point of entry to the interconnected mesh, controlling the interconnected mesh by a proxy connected to the interconnected mesh, and determining, by the proxy, virtual circuits in the interconnected mesh for routing the data to and between the end stations.

In accordance with another aspect of the invention, a method for determining a spanning tree of a network, the network having at least one switch and the switch having a plurality of ports, comprises the steps of sending, by each switch, a plurality of register commands, one register command being sent on each of the plurality of ports of the switch, receiving the plurality of register commands by a controller, selecting one of the received register commands, acknowledging the switch identified by the selected register command, and including the identified switch in the spanning tree of the network. The acknowledging step comprises sending a acknowledgement message to the identified switch. The method further comprises the step of propagating towards the controller, by a previously acknowledged switch, each register command received by that switch.

BRIEF DESCRIPTION OF THE DRAWINGS

A more complete understanding of the invention may be obtained by reading the following description in conjunction with the appended drawings in which like elements are labeled similarly and in which.

DETAILED DESCRIPTION OF THE INVENTION

In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Furthermore, although what is described herein is an ATM subnetwork for low-cost applications such as a home area network, it should be understood that the present invention is in no way limited in applicability to ATM networks as defined by the CCITT. Rather, one skilled in the art will recognize that the principles described herein may be employed in a wide variety of packet switching networks. For examples of some alternative networks, see de Prycker, pp. 50–58. In addition, the switches in the interconnected mesh may have all of the normal in-band functions of a normal ATM switch, including CLP interpreting, O&M response and levels of priority. However, one skilled in the art can appreciate that not all of these function may be needed in a low cost network for a home application environment.

Figure 1:
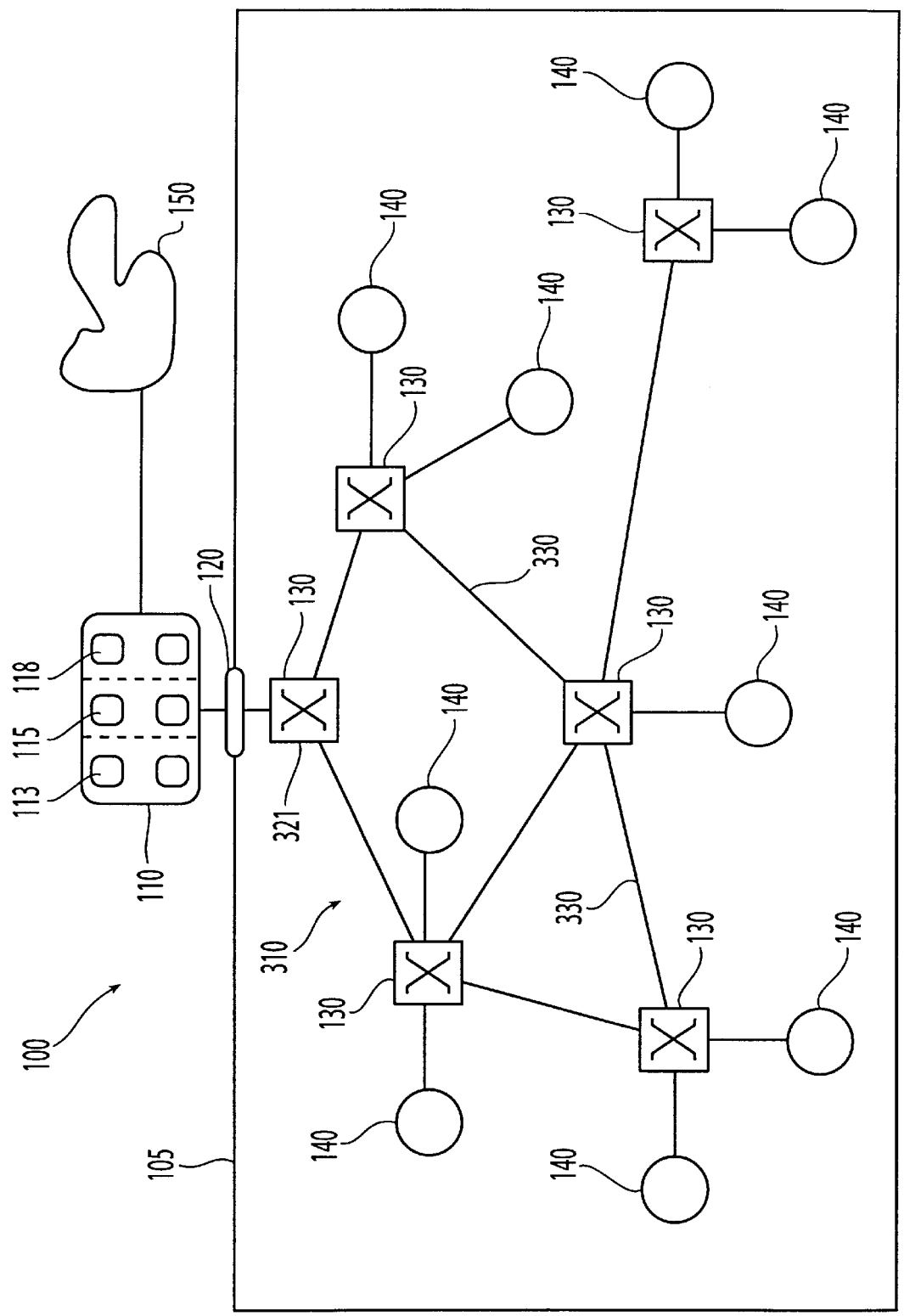
FIG. 1 is a diagram of an embodiment of an ATM subnetwork constructed in accordance with the principles of the present invention.

An ATM subnetwork constructed in accordance with the principles of the present invention is shown in FIG. 1. Subnetwork 100 comprises an interconnected mesh 105 of simple ATM switches 130 and end stations 140. Although all ATM switches are shown in the present invention by a single block 130, it will be obvious to one of ordinary skill in the art that an ATM switch may perform three basic functions—routing (space switching), queuing and header translation. Any particular switch may be implemented to perform one or more distinct functions, and hence each switch may be distinguished from another based on the way these functions are implemented and where in the switch these functions are located, see de Prycker, pp. 147–152. Hence, as will be obvious to one of ordinary skill in the art, although a switch is conveniently represented by a single block 130, depending on the context and the function to be performed, switches with different characteristics may be implied. External controller 110 resides outside interconnected mesh 105 and communicates with switches 130 and end stations 140 within interconnected mesh 105 via external control point 120. External controller 110 is optionally further connected to standard ATM network 150. Although end stations 140 can comprise a wide variety of possible devices, this designation will be used below, unless otherwise noted, to refer specifically to the ATM interfaces of such devices.

Figure 2A:
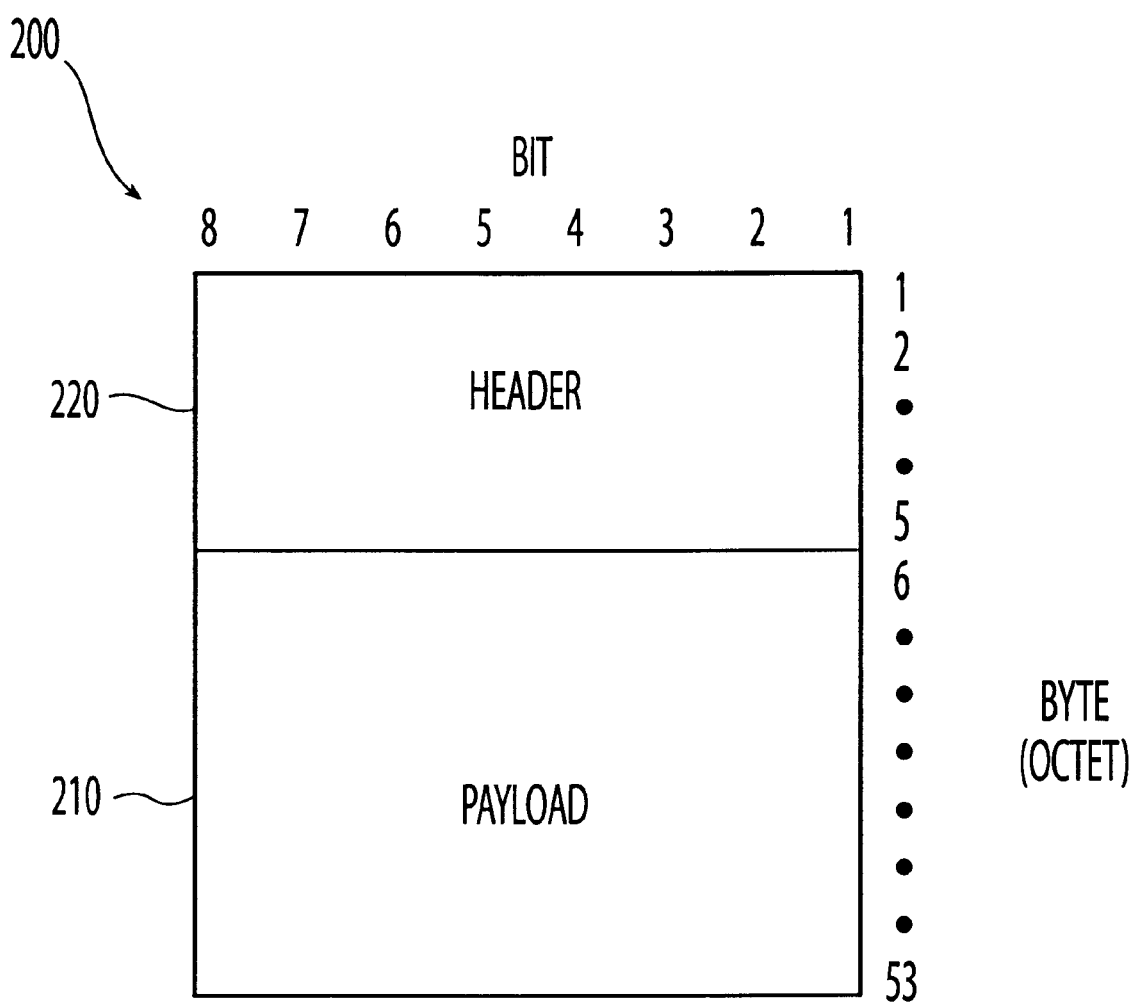
FIG. 2A is a diagram of an ATM cell as defined by the CCITT.

As ATM cells, though not essential, will typically be used in conjunction with the present invention, a description of a standard ATM cell would aid in comprehending the following description. FIG. 2A shows the format of an ATM cell 200 as defined in CCITT Recommendation 1.361. This format, adopted for use in B-ISDN and other wide-area networks, specifies a cell of 53 bytes (octets): an information field or payload 210 of 48 bytes (octets) which contains the user information which is the object of the transmission and a cell header 220 of 5 bytes (octets).

Figure 2B:
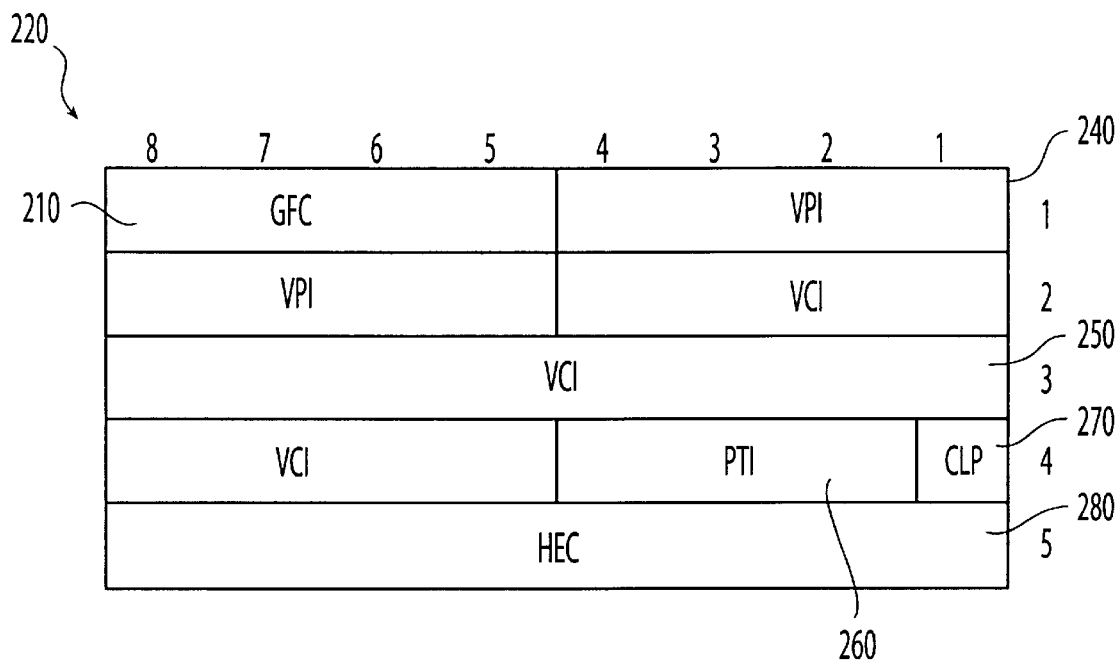
FIG. 2B is a diagram of an ATM cell header at the User-Network Interface as defined by the CCITT.

Cell header 220, or simply "header", is used for transmitting a variety of control information regarding the instant cell. FIG. 2B shows the structure of this header at the User Network Interface ("UNI"), that is the interface between an end-user device and an ATM switch. Here, the header is made up of a Generic Flow Control ("GFC") field 230 for specifying information which may be used to control traffic flow at the user-network interface, a virtual path identifier ("VPI") 240, a virtual circuit identifier ("VCI") 250, a Payload Type Identifier ("PTI") field 260 which provides information regarding the type of information contained in payload 210 of the cell, Cell Loss Priority ("CLP") flag 270 for setting the priorities relating to the abandonment of the cell during overload conditions, and a Header Error Control ("HEC") field 280 which contains an error control checksum for the previous four bytes (octets) in header 220.

It is an object of the invention to support interworking between existing ATM equipment as much as possible. However, the complexity of implementing full-scale ATM switching would be prohibitively expensive, and therefore, certain simplifications can normally be undertaken. One simplification is to implement only virtual channel identifier (VCI) switching in the switches. The virtual path identifier (VPI) field may be disregarded and always be set to zero. Only the 16-bit VCI field in FIG. 2B is remapped by the subnetwork switches. All other header fields are copies (apart from the header error control (HEC) which is recalculated for the new header). This simplification dramatically reduces memory requirements in these switches while at the same time supporting a reasonably large virtual channel space. It also supports the VCIs in the range of 0–31 which are conventionally reserved for signalling, metasignalling and operations and maintenance (OAM) purposes.

Figure 2C:
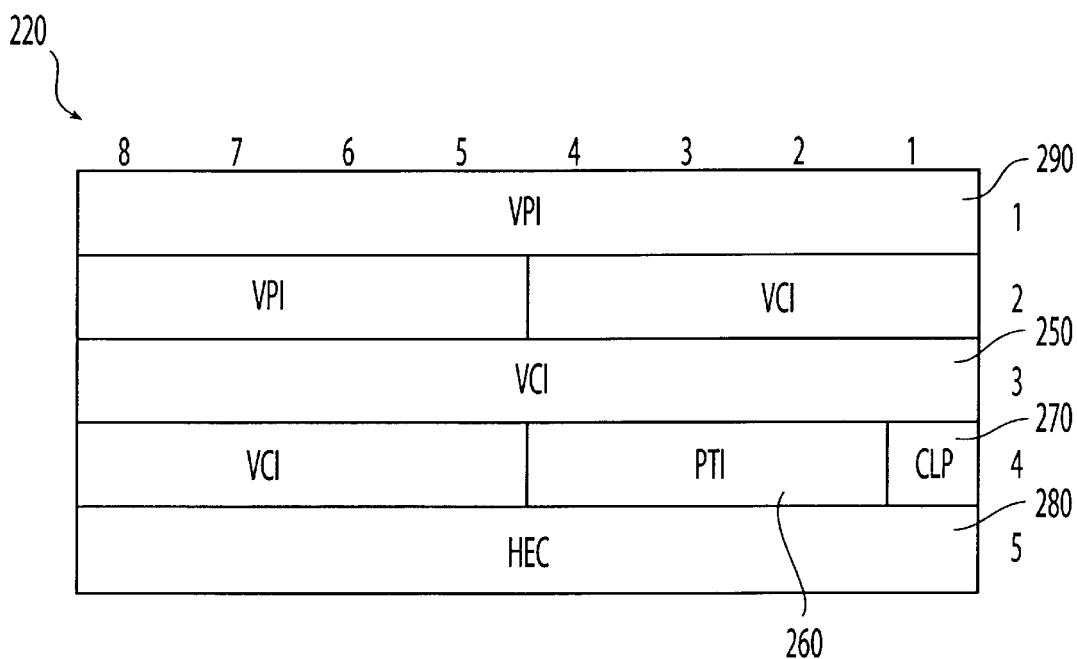
FIG. 2C is a diagram of an ATM cell header at the Network-Network Interface as defined by the CCITT.

FIG. 2C shows the format of header 220 at the Network-to-Network Interface ("NNI"), the interface between network switches. This header structure is identical to the structure at the UNI except GFC 230 is replaced with four additional bits of VPI 290. ATM networks do not provide for flow control of the type which is implemented in some packet networks and ATM networks have no facility to store cells over a long period of time. Therefore, inside an ATM network there is no need for generic flow control. Thus, GFC 230 may be eliminated in favor of an expanded VPI 290. However, if eight bits of VPI are sufficient, header 220 of FIG. 2B may be used throughout the network. For more information regarding standard ATM cell formats see de Prycker, pp. 124–28. Of course, when alternative packet networks are implemented, a cell may be a packet or any other way to provide a collection of data on a network.

One skilled in the art will recognize that alternative fixed cell sizes are possible. However, because interoperability between subnetwork 100 and wide area services is desirable, use of the standard 48-byte (octet) payload 210 size is recommended. However, header 220 size and format are not critical for interoperability with existing networks because headers are typically modified by ATM switches, while payloads are passed unaltered from one point to another. Therefore, header formats other than those shown in FIGS. 2B–2C may be utilized. See Dimitri Bertsekas & Robert Gallager, *Data Networks* (2nd ed., Prentice Hall, Englewood Cliffs, N.J., 1992), pp. 37–141, for examples of header structures suitable for use in a wide range of network technologies.

Although those of ordinary skill in the art will recognize from the following description that the present invention may be employed wherever traditional ATM networks are utilized, subnetwork 100 is particularly useful as the platform for an affordable home area network. A major portion of the cost associated with conventional ATM devices is represented by the memory and microprocessors which are necessary to support the signalling and management software required by current ATM protocols. Subnetwork 100 permits the use of low-cost, fully-hardware switches 130 and end stations 140 by banishing all control software to devices outside interconnected mesh 105, such as external controller 110. Typically, external controller 110 will be a set of software modules running on a general purpose computer external to interconnected mesh 105. When installed in the home environment, interconnected mesh 105 will normally exist within the home, and external control point 120 will be the home access point to wide area network services. Controller 110 may be a computer within the home or alternatively, it may be an external computer that is perhaps shared over multiple homes. In the latter case, the boundary to the home will normally still be via a specialized hardware unit which incorporates protection of the network, privacy for the user and the like.

Switches 130 and end stations 140, although implemented in fully hardware configurations, should preferably function as standard ATM devices from the point of view of an attached standard device; yet they cannot independently support the full ATM signalling stack. Instead, the control component of these devices has a simple standardized architecture which allows the switch to be simply monitored and controlled externally using a control protocol formed of single cell messages. This control protocol, discussed in more detail below, enables these devices to rely on proxy control to perform signalling and management functions. At least three types of proxy are needed for operation of subnetwork 100 as an ATM network. First, proxies 113 exist for all switches 130 within interconnected mesh 105. Second, proxy controllers 115, exist for end stations 140. Finally, proxy signalling agents 118 are established on a demand basis by procedures explained below in response to the detection of signalling originating from end stations 140.

External controller 110 is preferably a multitasking processor with loadable software modules and an ATM interface. For example, a Linux PC without screen or keyboard, but with PCMCIA slots, would be suitable. To allow it to set-up connections on behalf of end stations 140, external controller 110 maintains complete knowledge of the topology of interconnected mesh 105, a mirror of the contents of the routing tables of each switch 130, and information regarding virtual channel allocation on each link. Further, as can be seen in FIG. 1, external controller 110 may also act as a gateway enabling communication between interconnected mesh 105 and standard ATM network 150, while serving as a security firewall preventing unauthorized access to devices within interconnected mesh 105. Although depicted at external control point 120 in FIG. 1, those of ordinary skill in the art will recognize that external controller 110 may actually be situated several hops away over a further mesh of conventional ATM switches, e.g., in a central office. Furthermore, other conventional ATM networks 150 could conceivably hang off other switches 130 within interconnected mesh 105, but only one external controller 110 exists which is connected to interconnected mesh 105 via a single external control point 120. Further, it is possible to have other passive/standby controllers available as well. However, only one of these controllers is ever active at any one time thus defining a unique root to the tree.

Figure 1A:
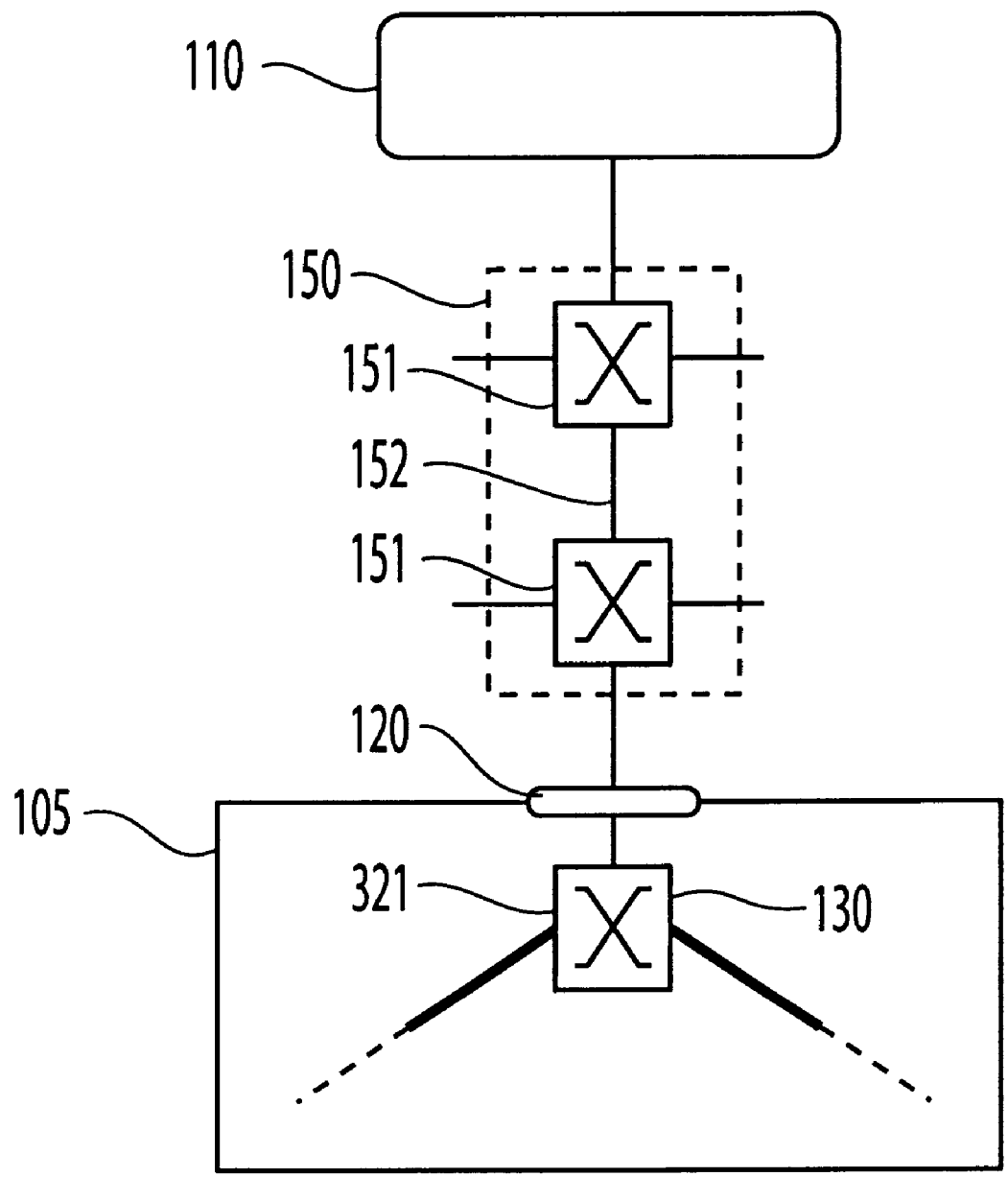
FIG. 1A is an alternative connection of the external controller to the interconnected mesh via an external switching network.

As described above, the external controller 110 may actually be situated several hops away over a further mesh of conventional ATM switches (e.g., in the central office of a town). In this alternative architecture shown in FIG. 1A, the external control point 120 is pushed down. Communication between the controller 110 and the interconnected mesh 105 is then achieved by setting up a virtual path tunnel 152 across the public network 150 (such as switches 151) to the external control point 120.

A proxy controller 113 manages each switch 130 within the interconnected mesh 105. These proxies are software modules running on a computer outside the interconnected mesh 105. This computer would normally be the same computer acting as external controller 110 for reasons of security.

A proxy controller 115 manages each end station 140 within interconnected mesh 105. Alternatively, a proxy controller 115 may manage a set of end stations 140, or all end stations 140 of a given type. Proxy controllers 115 are also software modules running on a computer outside interconnected mesh 105. This computer could be the same computer acting as the external controller 110, but proxy controllers 115 would then be separate software modules or processes.

Any end station 140 which is a standard ATM device will have its signalling requirements met through a collection of permanent virtual circuits to proxy signalling agents 118, again resident on computers outside interconnected mesh 105. As with proxy controllers 115, proxy signaling agents 118 may run on the same computer as external controller 110, or other distinct computers. Proxy signalling agents 118 perform the signalling functions of an intelligent ATM switch and communicate with external controller 110 to establish virtual connections to service standard ATM devices. These proxies convert between standard ATM signalling and the single cell messages needed to control the dumb switches. The protocol between the switch signalling proxies and the external controller could be the Forum's P-NNI or a simpler alternative.

As mentioned above, all forms of proxy communicate with their associated devices via a control protocol of single cell messages. In order for these single cell messages to be delivered to the appropriate devices, each device within interconnected mesh 105 must be uniquely addressable. Unique hard-wired or configurable identifiers could be employed, e.g., a 48-bit MAC address or other non-volatile configuration, but a less costly and more flexible method is preferred.

Therefore, in accordance with the principles of the present invention, each device is addressed using a source routing method which defines an address based upon the topology of a device's interconnection relative to external control point 120. Any end station 140, or switch 130, is addressed by providing the concatenated sequence of switch port numbers which forms the route from external control point 120 to the particular device. This scheme reduces the cost and complexity of switches 130 and end stations 140, and is well suited to manufacturing environments, such as the consumer goods industry, where the skills and technology to control unique address identifiers are not commonplace.

Figure 3:
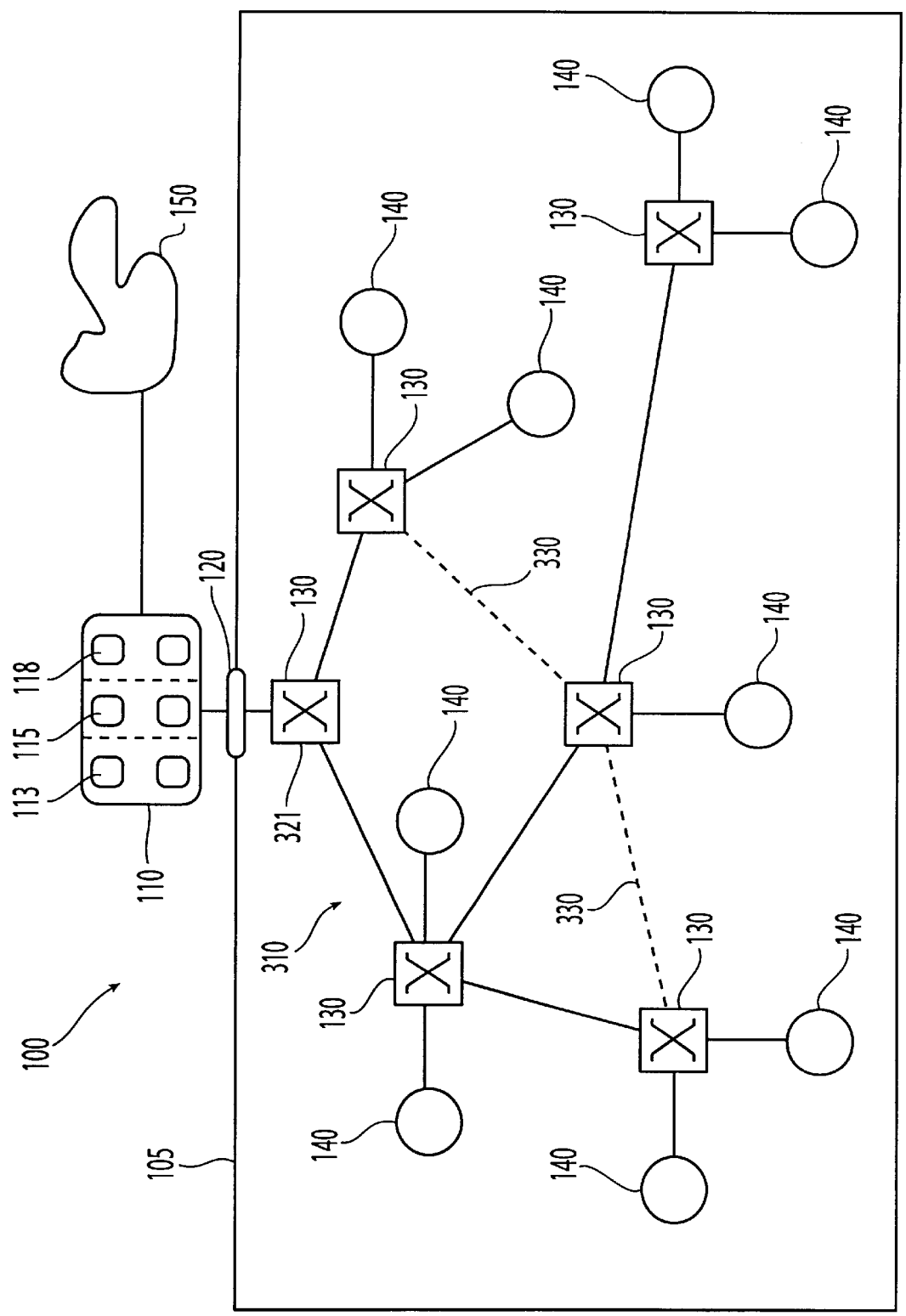
FIG. 3 is a diagram of a spanning tree superimposed on the ATM subnetwork of FIG. 1.

It will be recognized that since interconnected mesh 105 may have an arbitrary topology, two or more routes may exist from external control point 120 to a particular device. Therefore, as illustrated in FIG. 3, a spanning tree 310 rooted at external control point 120 is employed to define source route addresses. Each device within interconnected mesh 105 has a primary identity according to the unique route from external control point 120 to the device along spanning tree 310. A device may have further secondary identities if there are multiple routes from external control point 120 to the device.

Given that spanning tree 310 is rooted at external control point 120, control traffic in the form of single cell control messages can be defined as either down-traffic or up-traffic. Down-traffic is composed of control cells flowing from external control point 120 to devices within interconnected mesh 105, and up-traffic is composed of control cells flowing in the reverse direction.

In order to handle up-traffic, each switch 130 has a designated Up port which will be that port along spanning tree 310 pointing towards external control point 120. The Up port for a given switch 130 is not (in the most general case) hard-wired, but is instead determined during execution of a distributed topology determination algorithm, which is described in detail below. The particular switch 130 whose Up port is connected directly to external control point 120 is known as root switch 321. For security reasons (e.g., to deny masquerading controllers) the switches may be hard-configured in an appropriate manner, perhaps with an identifying plug or mark on one of the ports, such that they will only accept one of their ports as an Up port. This option provides security at the expense of less flexibility. The control protocol consists exclusively of single cell messages, or command cells, which are transmitted on two fixed virtual circuits, the down-channel and the up-channel. The down-channel, defined in the preferred embodiment to be VCI 30 (VPI 0) carries command cells from external controller 110 through external control point 120 to an end station 140 or a switch 130. Conversely, the up-channel, defined in the preferred embodiment to be VCI 31 (VPI 0) carries response command cells from end stations 140 or switches 130 back to external controller 110. The VCI and VPI values for these channels are hard-wired into switches 130 and end stations 140, together with the protocols necessary to interpret and generate command cells. The header 220 of command cells is never translated by switches 130, so these VCI values are preserved throughout interconnected mesh 105. All other virtual channel connections are available to standard ATM devices connected to subnetwork 100.

Figure 4:
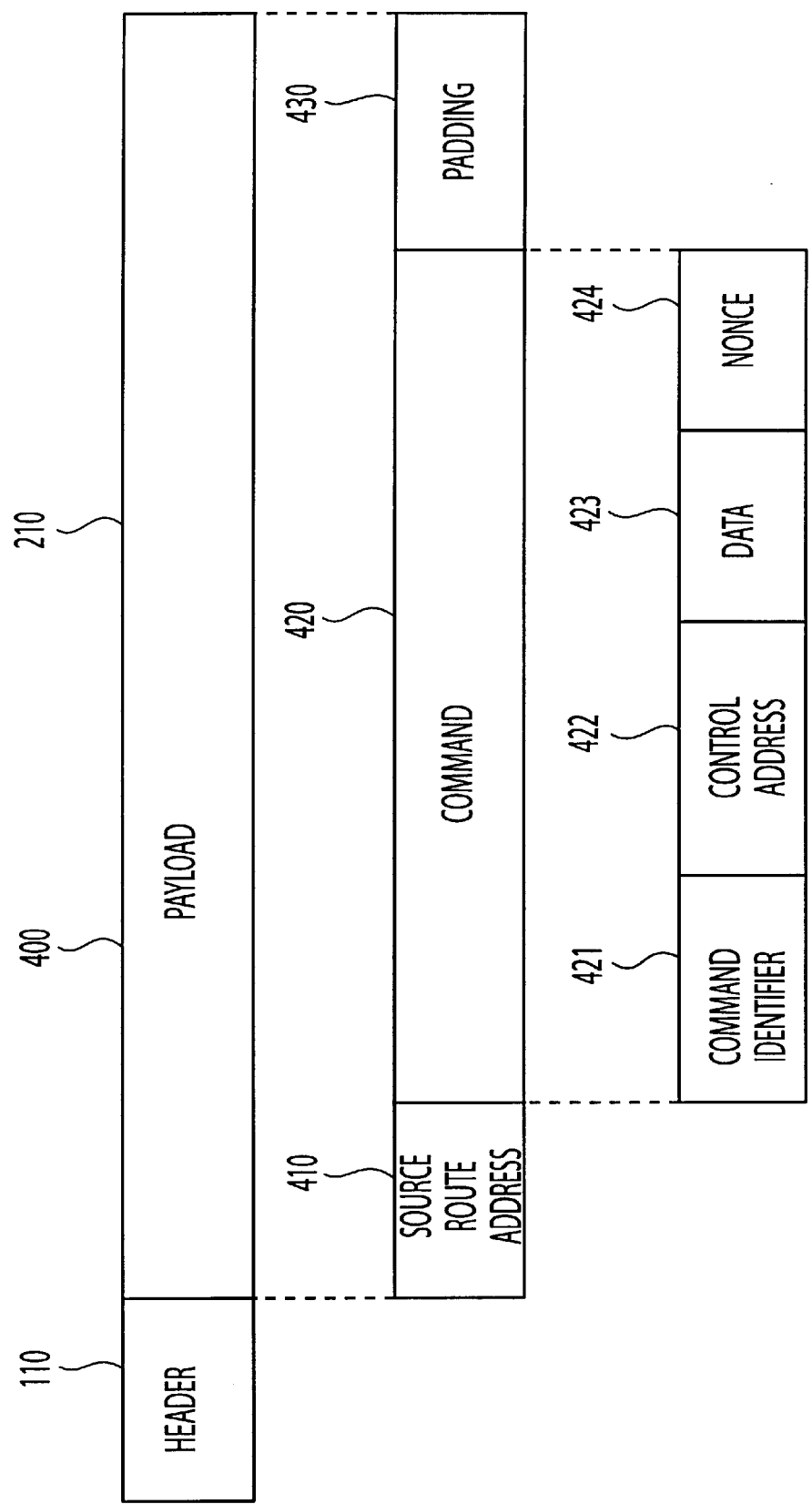
FIG. 4 is a diagram of a command cell used in the ATM subnetwork of FIG. 1 and shows the command field of the command cell.

FIG. 4 illustrates the basic format of a control cell 400. Control cell 400 comprises a standard ATM header 220 and a payload 210 composed of source route address 410, command 420 and a spare padding field 430. Source route address 410 comprises a sequence of bytes, up to a limit in the preferred embodiment of eight (8), which contains the concatenated sequence of switch port numbers, one port number per byte, which defines a device address. Command 420 contains a code defining a particular command to be executed. Padding 430 simply comprises additional unused space within cell payload 210.

In the present embodiment, down command cells 400 are routed to their correct destinations using source route address 410. The source route address 410 comprises a set of up to 8 routing elements, each encoded as a single octet. The command itself follows directly after the routing field in the cell payload. The command identifier is four octets long, but to aid switches in finding the boundary between the source route subfield and the start of the command proper, the top eight bits of the command identifier are set. Hence, a source route address element may have any value in the range 0–254, since address 255 marks the start of the command. It will be apparent to one skilled in the art that alternative schemes for distinguishing the source route address 410 from the command 420 may alternatively be employed. Additionally, although not vital for the operation of the invention, a subset of the available network addresses may be reserved as multicast group identifiers to enable access to a switch function which multicasts control cells.

Figure 5:
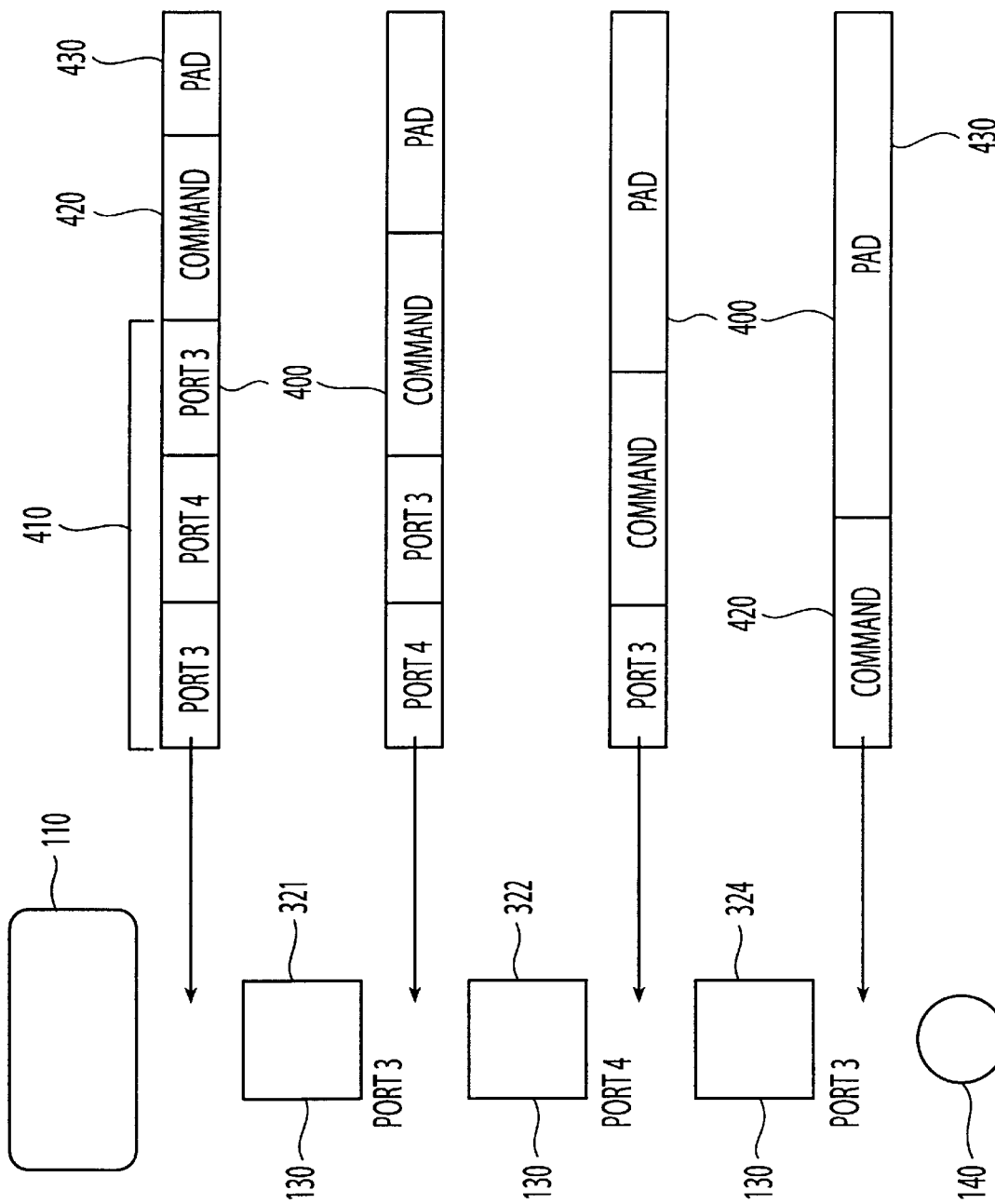
FIG. 5 is a diagram illustrating the source route addressing method used in the ATM subnetwork of FIG. 1.

When a switch 130 receives a command cell 400 on one of its ports, it examines the first byte of payload 210. If this byte indicates a command, switch 130 executes the specified command. Otherwise, switch 130 forwards cell 400 onto the port specified by the byte, which will be the first byte of source route address 410. However, before transmitting cell 400 onto this port, switch 130 shifts the bytes of payload 210 to the left such that the first byte of source route address 410 is deleted and an additional byte is added to padding 430. This process will be performed again by the next switch 130 to receive cell 400, and so on, until no source route address 410 remains, leaving command 420 at the start of payload 210. The switch 130 or end station 140 receiving that cell will execute the specified command. An illustration of this process is shown in FIG. 5, where a cell 400 destined for an end station 140 is shown after each pass through a switch 130. In FIG. 5, the target device is depicted as an end station 140, but commands can equally be intended for a switch 130. It is important to note that it is necessary for all switches along a specified route to support the control protocol.

Up command cells 400 sent by switches 130 or end stations 140, on the other hand, are always forwarded on the Up port of a receiving switch 130. Each receiving switch 130 modifies the payload of an up command cell 400 by prepending a byte at the start of source route address 410 which identifies the port on which the cell was received. The last byte of padding 430 is discarded. Thus, as command cell 400 propagates up spanning tree 310 to external control point 120, the identifiers of the ports encountered along the way are accumulated in source route address 410. When cell 400 reaches external control point 120, source route address 410 will contain the complete source route address for the device which originally transmitted cell 400. This process can also be seen in FIG. 5 by following the command cell 400 in an upward direction.

It will be recognized by those of ordinary skill in the art that the maximum depth of switches 130 within interconnected mesh 105 is limited to the number of bytes available in source route address 410. This in turn, along with the fan-out of installed switches 130, limits the number of devices within interconnected mesh 105. This should not cause any practical impediments, however. For instance, if the average number of ports per switch 130 is five (5) and eight (8) bytes of source route address is available, then over a hundred thousand devices is possible in a balanced tree, an acceptable limit for a low-cost subnet architecture.

If the user generates an unbalanced tree, in which certain branches exceed the nominal maximum depth (which is 8 in the preferred implementation), the controller will detect this when it receives a cell with an overly long source route field 410. Indeed, if the depth of the tree exceeds 48 hops, the controller will receive cells containing only routing bytes. In these situations, the controller will issue warning messages to advise the user that she should reconfigure the network topology.

The use of individual routing octets to identify switch ports is but one method of implementing an addressing scheme. Any equivalent addressing scheme could be used, provided the source routing information could be distinguished from the command.

Alternatively, one could regard the routing field as a large bit field in which each switch adds or removes only enough bits to uniquely identify the ports it has, e.g., a three-port switch need only use two bits. A variation on this theme is to use a list of self-describing routing elements in which the encoding of each element identifies both its length and its value.

In yet another option, a bit-mapped addressing scheme could be implemented using either fixed- or variable-length routing elements. Instead of a numeric encoding of port numbers, there is a one-to-one mapping between bits and ports; if a certain bit is set in the routing element, the switch routes the command to the corresponding port. In a bus-based hardware implementation of a switch in this subnetwork, this would enable multicasting of control protocol cells for "free."

A more general approach to multicasting would use numeric port addresses, but would reserve certain high values (e.g., 128–254) to be multicast port groups defined by poking bit maps directly into the memory space of the switch. This would enable multicasting on all virtual channel identifiers (VCIs), not just the down channel of the control protocol, albeit on the same VCI of each output port.

It will be clear to one skilled in the art that address fields may in fact consist of less or more than one byte, provided they are of a known size. Indeed, it would be possible to operate the network with a mix of such sizes, since the size used by a switch can be indicated in its static information block and this block may be read by the controller before it has to send any control cells through the switch itself. Almost any encoding for the source route may be used, provided it is possible to clearly distinguish routing and command information. It will also be clear to one skilled in the art, that address field inside control cells need not be numeric, but could be in a unary bit mask form.

Command cells 400 are used to implement a control protocol which permits the ATM signalling and management functions required for switches 130 and end stations 140 to be performed remotely from these devices. The control protocol revolves around a simple ping-pong framework. A command cell 400 carrying a command or inquiry is sent from external controller 110 on a downward journey to a switch 130 or end station 140 in the manner described above. At the recipient device, the command or inquiry is processed, the result inserted into a field in payload 210, and then the cell 400 is returned to external controller 110 via the Up ports of switches 130. These response cells may, preferably, have an acknowledgment bit (which could be, for example, the least significant bit of the command byte) which is set by a responding device before returning the cell. Hence, every command could have a command and acknowledgement form.

The control protocol of the present invention is based around one main type of cell. On its downward journey it carries a command or inquiry to be processed at a switch or end station. Here, the result is inserted into the data field 423 of the command 420, and then the cell is sent back to the external controller on the Up channel. Hence, every control protocol command can be viewed as a "ping-pong" operation or unit cell Remote Procedure Call sequence.

All commands carry a 32-bit nonce field 424 which is preserved by devices when they respond. This enables the controller to determine an association between a transmitted and received cell which is particularly useful in topology determination.

Every device is defined to have an internal control address space of $2_{32}$ bytes, although this will never be fully populated. The control protocol commands carry a 32-bit control address 422 and up to four bytes of data 423 (see FIG. 4). The basic operations are Peek and Poke of one to four bytes to the specified location in control address space. Every device has a type identifier at a fixed address. The type identifier has a hierarchic tree structure which is designed to allow essentially infinite expansion in the number of supported devices. The first division is between switches and end stations. Using the type, the controller can initiate the appropriate proxy for that device.

For a switch, the address space is further divided into major regions, corresponding to the routing tables of each port, the error and line parameters of each port and a central control and status block.

A continuity test to any part of the subnetwork can be made using a Peek command of any location within the probed device. Other control protocol commands currently defined (shown in Table 1 with their identifiers 421) are essentially minor variations on the operation of the basic read/write response command. Indeed, some of the operations shown may eventually be implemented using simple Peek and Poke conmmands.

TABLE 1

| Command | Command Identifier | Direction |
|---|---|---|
| Peek | 128 | Down |
| PeekAck | 129 | Up |
| Poke | 130 | Down |
| PokeAck | 131 | Up |
| Reserved | 132 | Down |
| SwitchBeacon | 133 | Up |
| Reserved | 134 | Down |
| StationBeacon | 135 | Up |
| Hello* | 136 | Down |
| HelloAck* | 137 | Up |
| Reset* | 138 | Down |
| ResetAck* | 139 | Up |
| SwitchProbe† | 140 | Down |
| SwitchProbeAck\ | 141 | Up |
| StationProbe\ | 142 | Down |
| StationProbeAck\ | 143 | Up |
| Reserved | 144 | Down |
| UnauthorisedTraffic | 145 | Up |

*Could be implemented as Poke.
\Could be implemented as Peek.

As can be seen from this table, commands are defined in pairs for which the Down command has the least significant bit clear, and the corresponding Up command has this bit set. A monitor in the controller can use this property, together with the unique nonce field to determine whether the commands it issues are being executed correctly.

No device is required to handle more than one control protocol cell at once and all control protocol semantics are designed to be insensitive to cell loss. This avoids the need for a transport protocol, and facilitates swift recovery after failure.

It will be recognized that using this simple protocol, the signalling and management functions typically performed independently by standard ATM devices may be performed remotely by external controller 110, proxy controllers 113 and 115 and proxy signalling agents 118. Thus, switches 130 and end stations 140 may be implemented in fully hardware configurations as long as they possess enough hard-wired intelligence to execute this control protocol.

Figure 6:
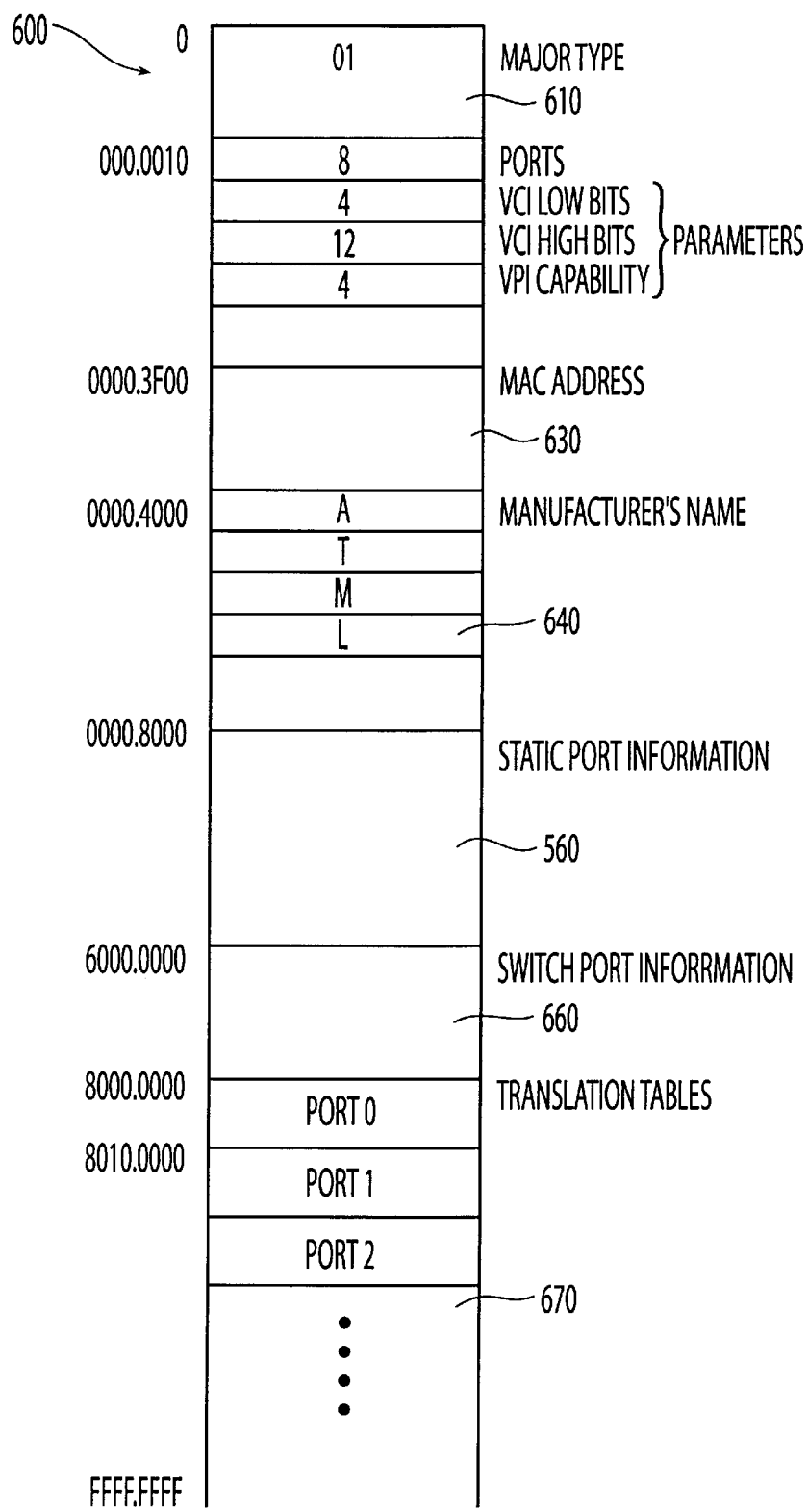
FIG. 6 is a diagram of a possible control address space of a simple ATM switch used in the ATM subnetwork of FIG. 1.

Every switch 130 or end station 140 is defined to have an internal control address space of $2_{32}$ bytes, though this address space is likely to be sparsely populated. FIG. 6 illustrates a possible control address space 600 for a switch 130. Address space 600 comprises a device type 610 which contains a permanently fixed value indicating that the device is a switch 130. Parameters 620 are read-only fields which indicate the number of ports of switch 130 and the range of VCI and VPI bits interpreted and translatable by switch 130. MAC address 630 provides space for a 64-bit unique identifier, e.g., a 48-bit IEEE MAC address coupled with an additional 16-bit manufacturer-determined field. MAC address 630 is optional because, as discussed above, subnetwork 100 does not require unique identifiers. Manufacturer's name 640 provides optional ASCII text space for the manufacturer's name and model number of switch 130. Static port information 650 contains read-only fields specifying static information regarding the ports of switch 130, such as port type and line rate. Switch port control 660 provides write locations to the physical line interface register set to control, e.g., clocking, cell format details and resynchronization procedures. This field typically would map the register set found inside common line interface chips. Switch port control 660 also provides read locations containing statistics about cells received, transmitted, errored or dropped. Finally, translation tables 670 contains the routing tables for switch 130, one table per port.

As previously discussed, external controller 110 uses knowledge of the topology of interconnected mesh 105 in order to perform virtual channel connection set-up and to route command cells to switches 130 or end stations 140 using the source route addressing method discussed above. Manual configuration of subnetwork 100 as a static network would be hopelessly inflexible and laborious. Instead, subnetwork 100 is self-configured via a dynamic topology determination algorithm.

The behavior of ATM switches in the subnetwork of the present invention differs slightly from that of normal ATM switches, as described below. The modified ATM switch of the present invention operates in one of two modes: Topology Determination mode and the more conventional Cell Switching mode. In both modes of operation, the normal switching of cells on virtual channel connections is not impeded. This makes a switch of the present invention transparent to UNI-compliant devices during the Topology Determination phase, and does not interfere with the flow of cells on established connections. The only constraint is that two VCIs are reserved for control protocol use, as noted above.

Specifically, external controller 110 performs two topology determination algorithms. The first algorithm determines spanning tree 310 which is used to route command cells within interconnected mesh 105. The second algorithm completes the task by determining all cross-links 330, as shown in FIG. 3, connecting switches 130 and end stations 140 within interconnected mesh 105, which can be used to route data among end stations 140.

When a switch 130 is initially activated, it does not know which port is its Up port and is therefore defined to be in topology determination mode. In this mode, switch 130 ignores all up channel (VCI 31) command cells which it receives, but periodically (e.g. once per second) transmits a SwitchBeacon command cell on the up channel (VCI 31) of every port. However, switch 130 will continue to switch data cells according to the entries in its translation tables 670, since switch 130 may have entered topology determination mode as a result of a partial reconfiguration of interconnected mesh 105. In this manner, cells on established connections will not be interrupted.

Since all switches 130, at least after a full power-up, will be initially in topology determination mode, SwitchBeacon command cells will be ignored by other switches 130 as up channel control cells. However, the SwitchBeacon command cell sent by root switch 321 to external controller 110 via external control point 120 will not be ignored by external controller 110. When external controller 110 receives a SwitchBeacon command cell, it will respond by sending a Hello command on the down channel (VCI 30). Within the source route addressing scheme, the route 410 from the external controller 110 to root switch 321 is the null route. Hence, the payload 210 of this Hello reply cell sent to root switch 321 will contain only the encoding for the Hello conmmand.

Upon receiving a Hello command cell on the down channel of any port, a switch 130 will set an internal Up port identification register to designate the port on which it received this acknowledgement cell. At this point, switch 130 leaves topology determination mode, stops sending SwitchBeacon command cells, and enters cell switching mode. In cell switching mode, command cells received on the up channel (VCI 31) of other ports are no longer ignored, but rather forwarded to the Up port as specified by the identification register.

As discussed above, when a switch 130 forwards a command cell on its Up port, it modifies the cell by prepending the port number at which the switch 130 received the cell to the start of payload 210. The final byte of original payload 210 is discarded. Thus, the route to the device which originally generated the command cell accumulates in the payload of the cell itself as it traverses interconnected mesh 105 on its journey toward external control point 120. When the initial SwitchBeacon command cell is received by external controller 110 for a particular switch 130, source route address 410 will contain the correct source route address for that switch 130. This will be the primary address of the switch 130 for all future control purposes.

Notice that once root switch 321 has been acknowledged by external controller 110 via a Hello command cell, switches 322 and 323 one hop away from root switch 321 will then be able to register because their SwitchBeacon command cells will now be forwarded by root switch 321 to external controller 110. Likewise, as these switches 130 are acknowledged, those below them (324 and 325) will be able to register. Thus, spanning tree 310 is constructed level by level in a top-down manner until all active switches 130 in interconnected mesh 105 are included. In addition, a means to reset to topology determination mode may be required. This could be implemented as another command cell or it could be inferred by a switch receiving a SwitchBeacon cell on the current up port.

The topology determination algorithm described above enables a spanning tree 310 of switches 130 to be automatically constructed when subnetwork 100 is initially switched on. Spanning tree 310 will be near-optimal if all the components of interconnected mesh 105 are present and powered up at about the same time. For a robust system, it is also necessary to consider the case in which devices are added or removed because of physical reconfiguration by the user or component failure.

When a new switch 130 is added to interconnected mesh 105, it will immediately commence the transmission of SwitchBeacon command cells on all ports as described above. The neighboring switches 130, assuming that they are operating in cell switching mode, will forward these command cells on their Up ports, and ultimately to external controller 110. Upon receiving this set of SwitchBeacon command cells, external controller 110 selects the one containing the shortest route and adds this route as a new branch of spanning tree 310. If there are two or more shortest routes of equal length, external controller 110 selects one according to some predetermined criterion, such as the number of devices already attached to the respective branches. This consideration will help to maintain balance in spanning tree 310. External controller 110 then returns a Hello command cell to new switch 130 along the selected route.

The situation is a bit more complicated when two or more switches 130 are powered-up simultaneously. Since devices within interconnected mesh 105 do not need to have a unique means of identification, external controller 110 will see two or more similar sets of SwitchBeacon command cells arriving through external control point 120. External controller 110 declares a winning switch 130 by again selecting the cell containing the shortest route and returning a Hello command cell to that switch 130 along the selected route. The winning switch 130 will then move into cell switching mode, whereas the losing switches 130 will continue to transmit SwitchBeacon command cells in topology determination mode. Hence, the topology determination algorithm transforms the scenario of having multiple devices powered up simultaneously to a scenario where the devices are powered up sequentially. Further, there may now be a shorter path between one or more of the losing switches 130 and external controller 110 via the winning switch, since winning switch 130 will always be closer to external point 120.

The registration process for end stations 140 follows a similar pattern as that for switches 130. When it is powered up, an end station 140 begins periodically (e.g., one second intervals) transmitting StationBeacon command cells on the up channel until it receives a Hello command cell from external controller 110. This scheme registers the device with external controller 110 and identifies the source route address of the end station 140 in the same fashion as with switches 130.

It will be recognized that the order in which switches 130 and end stations 140 are powered up is unimportant to the registration process. A device will continue to transmit a SwitchBeacon or StationBeacon command cell until it receives an acknowledgement from the external controller 110. As spanning tree 310 forms, devices at progressively deeper levels of interconnected mesh 105 will be able to register until spanning tree 310 is complete. The view from external controller 110 is that of a series of randomly arriving registration messages which are processed sequentially. At the same time, external controller 110 is able to build an internal map of interconnected mesh 105 for future reference.

In addition to initiating the registration of a switch 130, payload 210 of a SwitchBeacon command cell could be used to convey useful information about switch 130 to external controller 110. For example, a switch 130 can identify its type along with its maximum number of ports. Similarly, payload 210 of a StationBeacon command cell for an end station 140 can identify the channels on which it receives and sends data. The StationBeacon command cell can also briefly identify the class of a device, e.g., such as loudspeaker, microphone, power controller, infra-red receiver, or temperature sensor. The command cell can also encode the information to define a device with multiple capabilities. For instance, an ATM loudspeaker which is equipped with infra-red would be defined as a device with audio input and infra-red input/output. The class of a device could be represented as a bit field, followed by a list of VCI numbers corresponding to the data streams which are associated with the device. Those of ordinary skill in the art will recognize that myriad forms of information may be transmitted via these registration cells. A full description of a device is obtainable by reading its fixed descriptor values at the bottom of its virtual address space.

Subnetwork 100, as it will be understood by the skilled artisan, could operate successfully using only spanning tree 310 of switches 130 and end stations 140. However, if existing cross-links 330 within interconnected mesh 105 are ignored, a large amount of traffic will need to be routed through root switch 321. While this may be acceptable for the low bandwidth required for control protocol cells, routing large volumes of data through this single point is likely to result in significant traffic congestion and degraded network performance. Indeed, a practically designed interconnected mesh 105 is likely to include additional cross-links 330 between switches 130. These cross-links 330 will not form part of spanning tree 310 and will, therefore, not normally carry control protocol traffic. However, an efficient network will use these links 330 for transporting data between end stations 140.

Since all connection setup in subnetwork 100 is performed by external controller 110 on behalf of end stations 140, external controller 110 needs to have complete knowledge of the topology of interconnected mesh 105 in order to chose optimal routes between arbitrary end points. The execution of the above first topology determination algorithm to create spanning tree 310 of switches 130 provides external controller 110 with the knowledge of the route to every switch 130 within interconnected mesh 105, and the number of active ports at each switch 130. This information is used in executing a second topology determination algorithm which probes interconnected mesh 105 for additional cross-links 330.

For each switch 130 within interconnected mesh 105, it will be recognized that, using the source route addressing method, each of its neighboring devices can be addressed simply by appending each port number to the source route address of switch 130. Using this method, external controller 110 will send a SwitchProbe command to each of these neighboring devices. End stations 140 will ignore SwitchProbe command cells, whereas each switch 130 which receives a SwitchProbe command cell will respond by sending a SwitchProbeAck command cell, which includes the received nonce, on its Up port to be ultimately received by external controller 110. As with all command cells, the source route address of the switch 130 which sends the SwitchProbeAck command cell to external controller 110 will be accumulated along the way.

Upon receipt of the SwitchProbeAck command, external controller 110 will identify the corresponding SwitchProbe command which initiated the response using the nonce. As external controller 110 knows the address of switch 130 which was the target of the set of SwitchProbe command cells and the address of switch 130 which returned the SwitchProbeAck command cell, external controller 110 can deduce that a link exists between these two switches 130 within interconnected mesh 105. The entire topology of interconnected mesh 105 will be known after this process is repeated for each switch 130 in spanning tree 310.

After determining the complete topology of interconnected mesh 105, external controller 110 may discover that spanning tree 310, as determined by the first topology determination algorithm, is not optimal. It will be recognized, however, that external controller 110 is not confined to routing command cells along spanning tree 310; rather, external controller 110 can choose any route to a device on a dynamic basis. The best route may be the shortest or the least busy. However, up-traffic command cells from devices to external controller 110 will continue to be routed along spanning tree 310 as the first topology determination algorithm presets the use of the Up port of each switch 130.

If a switch 130 fails or if a user detaches a switch 130, an entire branch of spanning tree 310 may disappear and all switches 130 and end stations 140 attached to the faulty switch 130 will become unavailable for control purposes, even though they may continue to carry their current data stream. External controller 110 detects failures such as these and attempts to resolve these situations either by reconfiguring the network or by notifying the user.

To detect switch 130 failure, external controller 110 periodically transmits "ping" command cells to all devices within interconnected mesh 105. This does not include some dumb end devices which will not respond to ping cells, as is discussed in greater detail below. Indeed, some of these devices may be half-duplex. Each switch 130 and end station 140 responds to a ping command cell by returning a "pong" command cell to external controller 110. A nonce scheme is again used to associate pong command cells with ping command cells. If a device, switch 130 or end station 140, does not respond within a specified period of time, external controller 110 will assume that the device is no longer operational. After a reasonable retry limit has expired, external controller 110 will remove the device from its internal map of interconnected mesh 105, including spanning tree 310. External controller 110 will also free any resources associated with the missing or faulty device, such as virtual connections.

Physical reconfiguration of interconnected mesh 105 by the user presents an additional problem. If a user detaches a switch 130 or end station 140 and moves it to a different location, the affected devices will disappear from their old location and attempt to register at the new location. The new resulting spanning tree 310 formed may no longer be optimal. External controller 110 may, at this point, re-initiate a full two phase topology determination by returning all active switches to topology determination mode. As discussed previously, the first phase will determine the spanning tree 310 for control and the second phase will determine cross-links 330 for other communication. However, since end stations 140 are not necessarily uniquely identified by an IEEE MAC address or other scheme, but rather are identified by their position relative to external control point 120, the source route address of certain devices may change when spanning tree 310 changes. External controller 110 is not able to know the correspondence between devices in different configurations. To address this difficulty and to limit changing the addresses of the devices in the network when the configuration of the network changes, the topology determination algorithm will consider the old topology when assigning addresses to devices in the new topology. The topology determination algorithm will either directly use part of the old spanning tree, such that device addresses are preserved, or else it will build a mapping function between old and new addresses so that knowledge of device identity can be preserved. This assists upper layer configurations and applications which use devices in an established way. As a result, device addresses from the old topology can be retained as far as possible. When the spanning tree or physical topology has partially changed, where the changes are restricted to an alternative spanning tree over the same physical mesh, or a physical mesh which is largely similar to the previous one, the process of mapping new device physical addresses to their previous logical addresses may be completed by an additional processing step, executed by the controller, after the full, new network topology is established, whereby sections of the new topology are compared against sections of the old topology, and matching sections are considered to correspond to the same actual devices. It is preferable that the device types and as much old information as is available (e.g., unique identifiers, device types or infra-red collocation information) be brought to bear in this step.

There is some security risk involved when a switch processes Down commands which do not arrive on the Up port. Certain "Trojan Horse" devices could generate such commands and thereby gain a degree of control over the devices in the subnetwork. For example, a rough device which a user unwittingly plugs into his subnetwork could set up unauthorized virtual channels (VCs) between the controller and end stations and external agents using standard control protocol commands.

The definition of the control protocol of the present invention offers some protection against such attacks. Since control protocol commands have a "ping-pong" form, a device will always return a command response to the external controller. As long as the controller monitors outgoing and incoming control protocol traffic, it will notice a rough nonce if a command has been generated by an unauthorized source. Beacon commands are excepted from this since they are designed to be generated by devices.

To achieve significantly greater protection, a modified switch design incorporating a hard-wired (and clearly marked) Up port could be used. Such switches would neither execute nor forward control protocol Down commands unless they arrive on the Up port. Networks of such switches are then limited to pure tree topologies since the external controller has no way of probing the cross links. One practised in the art will recognize that switches could, as an exception to this rule, be designed to execute SwitchProbe commands arriving on a port other than the Up port in order to maintain the mesh probing functionality at the same time as gaining greater security from a hard-wired Up port.

The present invention achieves its low complexity, and hence low cost, by using simple end stations, switches with no software and proxies. The cost of the subnetwork 100, in accordance with the principles of the present invention, can be further lowered with a number of variations which reduce complexity. A major way to reduce the cost of an ATM-attached device is to restrict it to simplex operation. For example, some devices need only to be able to transmit data (e.g. a microphone) while others need only to be able to receive data (e.g. a loudspeaker). In the home environment or for general spatio-locality based control, it is often desirable to have an infra-red input or output from a device. Thus, the user may choose to fit an infrared input to modules which only have ATM output and infrared output to those which only have ATM input.

Additionally, the incremental cost of providing a 'through' ATM port on a module which is nominally a simplex receiving ATM module is low. A through port is an ATM simplex output which can connect to the input port of another instance of the same module or a similar module. In this way, a daisy chain of output devices can be created to allow sharing of a single switch port. A typical example is a set of stereo or surround sound loudspeakers. A through port can remain inexpensive because it is connected to a module's input port at a low level with no switching or buffering of cells. Therefore, no First-in, First-out ("FIFO") queues are required. For every cell received on a module's input port, one is repeated on the through port.

In order to separately address multiple modules in a daisy chain it is necessary either for them to be selective to which virtual channel identifiers they respond to (which implies that they are programmable or programmed in some way) or for the through port to slightly modify the cell header of each cell that it forwards. In order to address multiple identical devices in a daisy chain, algebraic manipulation of VCI values in the cell header is a simple solution. The simplest manipulation is to subtract a number, such as 32, from the VCI of each cell that is forwarded. In this manner, each device is addressed by its relative position along the chain. This technique could be used for a loudspeaker.

The wiring within interconnected mesh 105 may use conventional ATM point-to-point links, such as the ATM25 standard, or it may use multi-access, slotted busses, or rings. Conventional links, like ATM25, can be used as part of a multi-access slotted bus, provided that a head-end generates a continuous stream of empty cell slots. Stations with cells to transmit only overwrite these empty cell slots. Receiving stations can perform filtering based on VCI and VPI masks. Providing fairness or other load-balancing between contending transmitters can be done using call admission control and/or any of the conventional techniques. The stations connected to such a shared medium operate within a common VCI address space.

It should be recognized by those of ordinary skill in the art that in-band data flowing in and through subnetwork 100 is not restricted in its choice of adaptation layers since the standardized ATM layer service is available. Thus, the accepted protocol stacks may be used, such as TCP over IP over AAL5 over ABR over ATM. However, in a low cost ATM system it is worthwhile defining alternative adaptation layers which can perform valuable functions but are simple enough to be implemented in hardware. Examples include audio, infra-red, button pushes and reliable data.

The subnetwork of the present invention also includes support for dumb end devices which cannot respond to the command protocol. Such devices register themselves by simply sending cells (perhaps a fixed rate stream of audio sample cells from a very simple ATM microphone). In its status registers, the switch flags the fact that cells of an unknown nature are being received on a particular port (there is no VCI mapping entry for that flow), and this status register may be remotely read from the switch by the controller from time to time. Alternatively, switches receiving cells for which the appropriate routing table entry is set to a special value, can transmit an UnauthorisedTraffic command to the controller at an appropriate rate (once per second), in order to explicitly flag the existence of a new traffic source. The controller could arrange to route the cells to it, then look in them to see what sort they are (e.g., perhaps the AAL used involves an explicit type description byte or other self-identifying property). It would thus gain knowledge of the device.

An example of such a dumb end device is a microphone which generates a stream of cells immediately on powering; these can be identified by the controller by reading the error statistics for the switch (using Peek commands) which will show that there is a number of unexpected cells arriving on a particular port. The controller will then direct the flow of cells to itself (or an agent) which will determine from embedded type information or otherwise, that the cells come from a microphone. Having determined the nature of the source, the controller will alter the routing tables of the switches back to their earlier state such that cells from the microphone are discarded once again. When, at some later time, audio input is required by an application, it will set up an appropriate connection between the microphone and some other device. In this way, the routing table of the switch immediately adjacent to a dumb end station can be used for simple on/off control of that device.

Another example of a dumb end device is an output device which sends infra-red signals. By sending cells to this device, either as a result of an exhaustive search, but preferably based on some hint, the existence and correct functioning of the device may be determined from detection of infra-red receptions at other points in the same environment. The same technique can be used between other pairs of devices that operate using a common medium such as a loudspeaker and a microphone.

The physical topology of the subnetwork of the present invention is a mesh consisting of conventional point-to-point ATM25 links. While this is an ideal solution for linking switches together, a low bit rate end station such as a microphone or loudspeaker is unable to make cost-effective use of the bandwidth available at the point of attachment if this is a dedicated switch port. It is possible to share the available bandwidth by connecting several devices to the same port by means of multi-access buses or rings. Conventional ATM physical layer cell formats may readily be used as links in such a multi-access bus. For the slotted links, such as STS-3, empty cell slots are already defined as having VCI zero; a transmitter may overwrite any cell slot. For non slotted links, such as ATM25, transmission can be controlled by techniques such as "token tagging," where a slot chain is built up as required. The receiving stations can perform filtering based on VCPI masks. Fairness or other load-balancing between contending transmitters can be achieved using call admission control and/or other conventional techniques known in the art.

The schemes described below are based on a non-slotted ATM25 link similar to those used elsewhere in the subnetwork. However, as a result of their unique topological properties, it is not always possible to maintain full ATM semantics. VCIs are not always allocated in a bidirectional manner, for example, so OA&M procedures and certain aspects of Q.2931 are not supported. However, since the multi-access topologies are designed for attaching 'dumb' end devices and not for 'intelligent' UNI-compliant devices, the deviation from standards is considered justifiable in the context of achieving low-cost connectivity between end stations whose management and signalling are usually performed by proxy.

Since a multi-access bus or ring is connected to a single switch port, the VCPI space available at that port must be shared amongst the end stations in such a way that cells are delivered to the correct station, and according to a clear and simple set of rules which can be implemented cheaply and identically in all such stations.

Figure 7:
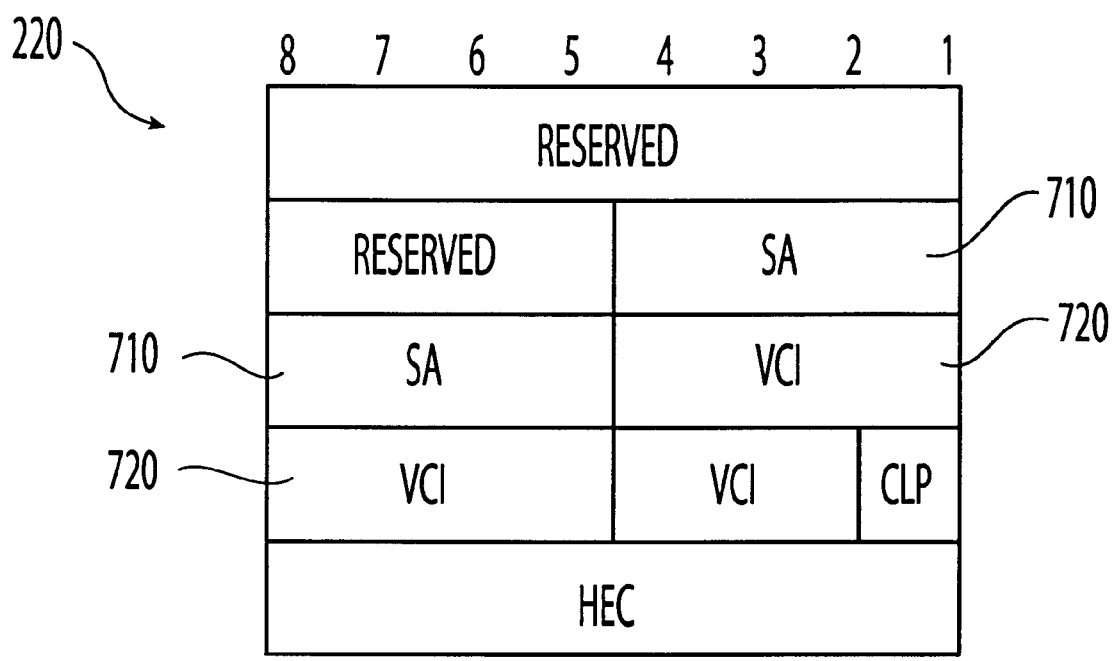
FIG. 7 is a diagram of an ATM cell header format used on multi-access links in the ATM subnetwork of FIG. 1, showing 8-bit station subaddress field and 8-bit VCI space.

A common method of addressing ATM stations on a shared medium is to use the VPI field of the cell header (or some part thereof) as a station subaddress. However, as described above, the VPI field may be entirely disregarded in the subnetwork. Therefore, the available VCI space must be partitioned such that some bits are available for addressing within a device and some for selecting the device to be addressed, as shown in FIG. 7. In one embodiment, the 16-bit field is split in half. The top eight bits 710 are used to identify a station, leaving a reduced 8-bit VCI space 720 for each station. This enables one to address up to 256 stations (although in practice some of these subaddresses will be reserved). The range of available VCIs (32–255) will then more than suffice for simple end stations.

Figure 8:
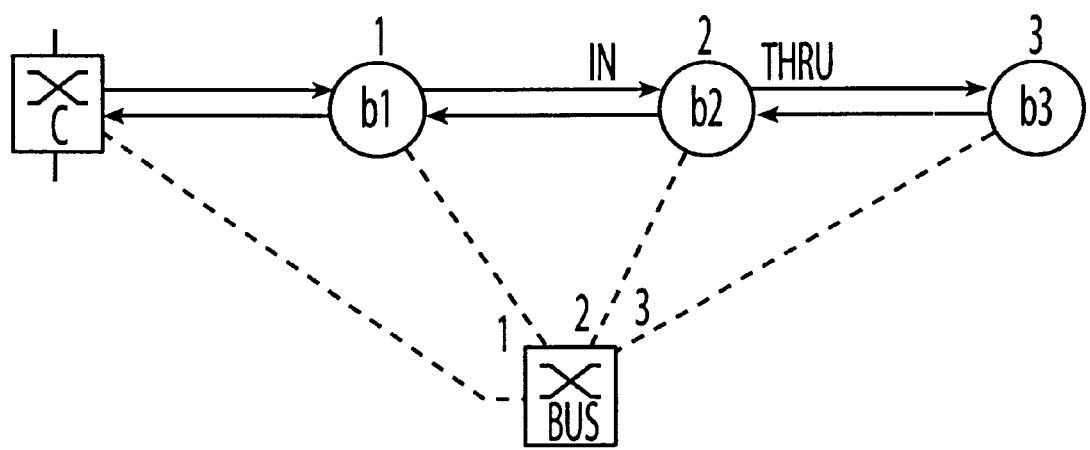
FIG. 8 is a diagram showing the physical (solid lines) and logical (broken lines) views of the bus of the subnetwork of the present invention.

The bus of the subnetwork of the present invention is an ATM25-based bus which allows multiple end stations to be daisychained onto a single switch port (see FIG. 8). Each bus station provides two ATM ports: one called In, which links it to the previous station in the chain (or the switch itself in the case of the first station) and the other, called Thru which links it to the next station in the chain (or not if it is at the end of the chain). In the first variation of this design, both ports allow full duplex operation.

The bus is arranged in such a way that the VCI space of the link is shared equally amongst the stations, and the stations are identical without containing unique identifiers. Because of this, as already described, bus stations must have the ability to manipulate the VCIs of cells arriving at their interfaces. Additionally, special arrangements are made for command control cells to enable individual stations to be addressed uniquely. As described above, the control protocol of the present invention uses VCI 30 for Down commands and VCI 31 for Up commands. This principle can only be maintained in the bus of FIG. 8 if additional routing information is present in control protocol cells in order to identify the target or source station on the bus. This may be achieved as follows: Each Up command generated by a bus station is transmitted on VCI 31 of the In port (i.e., towards the switch end of the bus). However, an end station designed for the bus of FIG. 8 always prepends the command with a single routing byte (octet) which has the value one ($00000001_2$) before transmitting it. This looks like any normal routing element, but is referred to in this context as the Bus Subaddress.

On receiving an Up command cell on VCI 31 of its Thru port, a bus station immediately forwards it on VCI 31 of its In port. However, the value contained in the bus subaddress byte (octet) is incremented each time it passes through a bus station. Hence, when it finally finds its way back to the switch, the bus subaddress contains a value equal to the number of hops made along the bus. The switch then prepends a new routing element to the control protocol cell, as usual, and sends it up towards the external controller.

From the point of view of the external controller, the bus subaddress looks just the same as the other routing elements in the cell payload. Hence, when source routing Down commands, the bus subaddress is inserted, as expected, as the last element in the routing field 410. When the Down command emerges from the final switch along the source route on VCI 30, there is a single routing element, the bus subaddress, remaining at the head of the cell. On recognizing the VCI as the control protocol Down channel, a bus station examines this routing element and selects one of three possible courses of action according to its value: (1) The bus subaddress>1: The value of the bus subaddress is decremented and the cell is forwarded to the Thru port, otherwise intact. (2) The bus subaddress=1: The command is executed by the station and is then discarded. (3) The bus subaddress=0: The command is executed by the station and is also forwarded to the Thru port with the same subaddress.

It can easily be deduced from the above that the stations on the bus are numbered sequentially 1, 2, 3, ... 254 and that subaddress zero is the bus broadcast address. Moreover, if an end station designed for the bus is attached singly to a switch, the station functions in a identical manner to a regular end station 140 apart from the additional (redundant) octet used for routing control protocol messages.

The use of an extra routing element to address stations on the bus can be thought of as a kind of 'virtual switch' with a large number (up to 254) of ports (shown by broken lines in FIG. 8). However, the switching function for control protocol cells is implemented in a distributed manner. Each station need only examine the first payload byte of each cell to decide how to deal with it. The additional logic required to do this, together with the hardware for the Thru port costs very little, and may prove more cost effective than buying more switches in the subnetwork.

For the purposes of registration with external controller 110, a bus station beacons StationBeacon commands on the Up channel of its In port, just like a normal end station. Whilst in this mode, the station continues to forward cells between its Thru and In ports, but discards any Up command cells arriving from downstream nodes. This enables orderly registration of bus stations without swamping the network-wide Up channel with unnecessary traffic. It also enables the controller to find out about devices in a strict top-to-bottom fashion.

A station's identity is precisely the same as its sub-address discovered at the Topology Determination stage. However, for data virtual circuits, this identity is placed in the upper eight bits of the VCI field 710; the actual VCI is placed in the lower eight bits 720 (see FIG. 7). On receiving a cell at its In port on a VCI which is not one of the Cat, two control protocol channels, a station examines the bus subaddress 720 as follows: (1) The bus subaddress>1: The value of the bus subaddress is decremented and the cell is forwarded to the Thru port, otherwise intact. (2) The bus subaddress=1: The cell is consumed by the station. (3) The bus subaddress=0: The cell is consumed by the station, but is also forwarded to the Thru port with the same subaddress.

This scheme bears a marked resemblance to that just described for dealing with control protocol commands. Again, subaddress zero is reserved for broadcast purposes. However, it is important to note that here the subaddress is to be found in the upper bits of the VCI header field, whereas for the control protocol, the subaddress resides in a routing element at the head of the cell payload.

A symmetric scheme is employed for upstream cells generated by bus stations. The station selects an 8-bit VCI 720, sets the bus subaddress field 710 to one ($00000001_2$), and passes the cell for transmission on the In port. On receiving such a cell on its Thru port, the station upstream realizes that this is not a control protocol cell and increments the bus subaddress 710 before passing the cell upstream on its In port.

Figure 9:
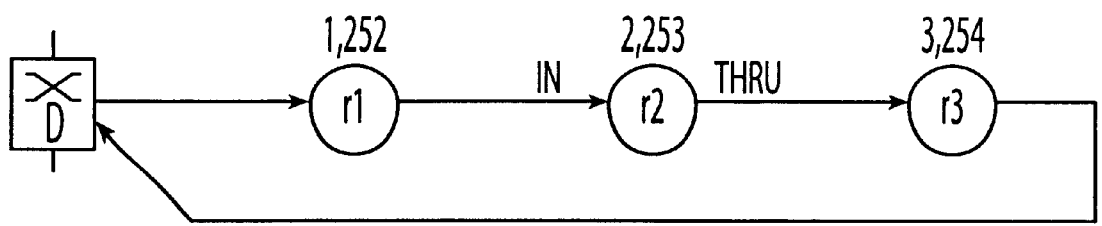
FIG. 9 is a diagram showing the topology of the loop (i.e., a unidirectional daisychain) showing downstream and upstream subaddresses.

A further simplification of the bidirectional bus concept described above is a unidirectional daisychain which leaves the switch port and passes through some number of simplex stations before returning to the same switch port (see FIG. 9). This configuration may be thought of as a 'loop' around the subnetwork. Note that the return link to the switch is optional for a chain of receive-only devices. A unidirectional chain of stations which is strung between two different switch ports is also possible, but differs only in detail.

The obvious advantage over the bidirectional bus topology is that only half the number of ATM ports is required. In this case, a single port suffices if the receive section is wired to the socket marked "In" and the transmit section to the "Thru" socket. However, the disadvantage is that only half the number of stations can be addressed. Although the logical topology is a loop, the physical implementation could be a bus in which stations are actively connected only to the downstream half of the ATM links at the two sockets; the upstream signal would be passively repeated from the Thru socket to the In socket. In order to terminate the bus, the final station (r3 in FIG. 9) would loop back the downstream into the upstream at its Thru socket. This need not be a physical loopback cable, but could be the default electrical configuration of a loop station when there is nothing plugged into its Thru socket.

This simplified wiring scheme allows the loop to be implemented as a simple string which, superficially, resembles the bus of FIG. 8. However, the differing operation of loop stations described below precludes interworking with bus stations on the same shared medium.

We now describe the control protocol on the loop of FIG. 9. The rule for Down commands arriving on VCI 30 of the In socket is the same as for the bus, with the same decrementing scheme for addressing loop stations. Again, subaddress zero is the broadcast address for the loop. The procedure for transmitting Up commands differs slightly since they must be sent downstream towards the switch via the Thru socket. As usual, VCI 31 is used, but now the initial value of the subaddress routing byte is 254 and each station through which the command passes decrements the subaddress until it arrives at the switch.

The subaddress accumulated in Up command cells will be different from that used in route Down commands to any given loop station. However, the two values are related by the number of stations in the loop and the external controller can determine this length during the registration process, as described below.

Since the loop is unidirectional, a station which is beaconing registration commands to the controller cannot completely ignore control protocol commands arriving at its In socket since these may be from the controller. In this case, the rule is that Down commands are processed (executed and/or forwarded) as normal, and all Up commands except beacons are forwarded. The order of registration is thus the exact reverse of that in the bus with the last loop station (r3 in FIG. 9) able to register first.

Having received a StationBeacon command from station r3, the controller does not know the downstream subaddress necessary to return a Hello. Instead, the controller -issues a StationProbe command to the first station in the loop, whatever that might be. Despite being in beaconing mode, station r1 in FIG. 9 will respond to this with a StationProbeAck and stations r2 and r3, also in beaconing mode, will forward this back to the controller. The nonce value of this response can be correlated with the original probe. The relationship between the Up and Down subaddresses for subsequent stations in the same loop is given by equation (1) below, and the number of stations in the ring, n can then be deduced using equation (2).

$$SA_{down}=n-(254-SA_{up}) \quad (1)$$

but since $SA_{down}=1$ for the first station in the loop, $$n=(255-SA_{up(r1)}) \quad (2)$$

Thus, having determined the value of n, the controller can now return a Hello command to r3, and the remaining stations in the ring (r3 and then r2) can then register without the need for any further probing of the loop.

The controller must ensure that, when sending commands to the loop, the subaddress does not exceed the number of stations. If $SA_{down} \geq n$, there is a danger that the command will emerge from the ring and re-enter the switch with a routing byte still at its head, and consequently be delivered to a completely different end station.

For data channels on the loop, a solution similar to that for the bus is presented, but modified to accommodate the unidirectional nature of the loop topology. In the case of cells destined for loop stations, the scheme is identical to the bus case. Cells generated by loop stations, however, cannot begin with subaddress one, since this will be consumed by the adjacent station. Instead, cells are transmitted with subaddress 254 and, having earlier correlated the upstream and downstream subaddresses by equation (2) above, the external controller will be able to set up the routing tables in switch D in FIG. 9 correctly.

If there are more than 127 loop stations on the loop, the downstream and upstream subaddress spaces will overlap, and there is a danger of a station downstream of the transmitter consuming cells not intended for it. Fortunately, simplex loop stations which either send or receive cells (but not both) are not susceptible to this problem.

It should be understood that various modifications will be readily apparent to those skilled in the art without departing from the scope and spirit of the invention. Accordingly, it is not intended that the scope of the claims appended hereto be limited to the description set forth herein, but rather that the claims be construed as encompassing all the features of patentable novelty that reside in the present invention, including all features that would be treated as equivalents thereof by those skilled in the art to which this invention pertains.

What is claimed is:

1. A method for determining a spanning tree in a network having one or more components comprising the steps of:

sending one or more register commands from the one or more components;

selecting at least one of the register commands by a controller for identifying at least one of the components;

including said at least one identified component in the spanning tree.

2. A method for determining a spanning tree as in claim 1 further comprising the step of:

acknowledging said at least one identified component.

3. A method for determining a spanning tree as in claim 2 wherein said acknowledging said at least one identified component step comprises the step of:

sending an acknowledgment message by the controller to said at least one identified component.

4. A method for determining a spanning tree as in claim 3 wherein said acknowledging said at least one identified component step further comprises the step of:

receiving said acknowledgment message at said at least one identified component.

5. A method for determining a spanning tree as in claim 2 further comprising the step of:

propagating said one or more register commands through the controller if the component has been acknowledged.

6. A method for determining a spanning tree as in claim 5 wherein said one or more register commands propagate toward the controller.

7. A method for determining a spanning tree as in claim 5 wherein said one or more register commands propagate away from the components that sent said one or more register commands.

8. A method for determining a spanning tree as in claim 2 further comprising the step of:

discarding said one or more register commands at the component if the component has not been acknowledged.

9. A method for determining a spanning tree as in claim 1 further comprising the step of:

receiving at least one of the register commands at the controller.

10. A method for determining a spanning tree as in claim 9 wherein said selecting at least one of the register commands step comprises the step of:

selecting said at least one received register command that propagated through the fewest number of the components.

11. A method for determining a spanning tree as in claim 9 wherein said selecting at least one of the register commands step comprises the step of:

selecting said at least one received register command that balances the spanning tree.

12. A method for determining a spanning tree as in claim 1 wherein the one or more components comprise one or more switches.

13. A method for determining a spanning tree as in claim 1 wherein the one or more components comprises one or more end stations.

14. A method for determining a spanning tree as in claim 1 wherein said sending one or more register commands step commences execution by the one or more components when said components are powered up.

15. A method for determining a spanning tree as in claim 1 wherein said one or more register commands comprise data about the one or more components.

16. A method for determining a spanning tree as in claim 15 wherein said data comprise one or more types of the one or more components.

17. A method for determining a spanning tree as in claim 15 wherein said data comprise the number of ports on the one or more components.

18. A method for determining a spanning tree as in claim 15 wherein said data comprise one or more classes of the one or more components.

19. A method for determining a spanning tree as in claim 18 wherein said one or more classes comprises one or more members of the group consisting of loudspeaker, microphone, power controller, infra-red receiver and temperature sensor.

20. A method for determining a spanning tree as in claim 1 further comprising the step of:

recording an address of said at least one identified component in the spanning tree.

21. A method for determining a spanning tree as in claim 3 further comprising the step of:

receiving said acknowledgment message by said at least one identified component.

22. A method for determining a spanning tree as in claim 21 wherein the components have one or more ports and said acknowledgment message is received by at least one of said ports of said at least one identified component.

23. A method for determining a spanning tree as in claim 22 further comprising the step of:

identifying said at least one port that received said acknowledgment message.

24. A method for determining a spanning tree as in claim 23 wherein said identifying said at least one port step comprises the step of:

identifying said at least one port that received said acknowledgment message as an up port.

* * * * *